Figure 1:
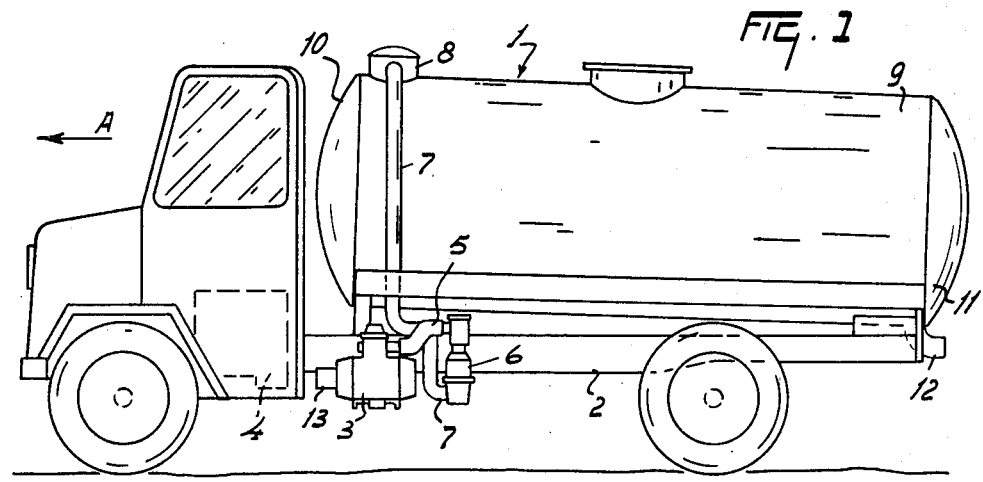

United States Patent [19]

van der Lely

[11] 4,361,039
[45] Nov. 30, 1982

[54] TANK FOR TRANSPORTING LIQUID MATERIAL

[76] Inventor: Cornelis van der Lely, 7, Brüschenrain, Zug, Switzerland

[21] Appl. No.: 146,085

[22] Filed: May 2, 1980

[30] Foreign Application Priority Data

May 8, 1979 [NL] Netherlands ..................... 7903575

[51] Int. Cl.³ ................. F04B 49/04; G01F 23/10
[52] U.S. Cl. ..................................... 73/313; 73/317; 141/95; 277/135; 338/33
[58] Field of Search .................. 73/313, 308, 304 R, 73/317; 141/231; 417/40; 406/56; 338/33; 277/135

[56] References Cited

U.S. PATENT DOCUMENTS

| | | | |
|---|---|---|---|
| 1,881,265 | 10/1932 | De Giers | 73/317 |
| 2,522,077 | 9/1950 | Wahl et al. | 406/56 X |
| 2,562,529 | 7/1951 | De Giers | 73/317 |
| 2,738,208 | 3/1956 | Mylander | 277/13 |
| 2,738,678 | 3/1956 | Cherry et al. | 73/304 R X |
| 3,200,644 | 8/1965 | Brous | 73/317 X |
| 3,372,842 | 3/1968 | van der Lely | 222/156 |
| 3,411,672 | 11/1968 | van der Lely et al. | 222/155 X |
| 3,685,357 | 8/1972 | Alexander | 73/313 |
| 3,686,451 | 8/1972 | Pottharst, Jr. | 73/317 X |
| 3,939,471 | 2/1976 | Momberg | 73/313 X |
| 4,057,364 | 11/1977 | Bratschitsch | 417/34 |
| 4,091,846 | 5/1978 | Legleiter | 141/198 X |
| 4,114,130 | 9/1978 | Sutton et al. | 73/317 X |
| 4,156,530 | 5/1979 | Rivkin et al. | 277/135 |
| 4,184,370 | 1/1980 | Schlick et al. | 73/313 |
| 4,203,325 | 5/1980 | Cowles et al. | 73/304 R |
| 4,244,403 | 1/1981 | Legleiter | 141/94 |
| 4,277,773 | 7/1981 | Blatnik | 73/304 R X |
| 4,287,756 | 9/1981 | Gallager | 73/304 R |

FOREIGN PATENT DOCUMENTS

323632  1/1930  United Kingdom .............. 277/135

*Primary Examiner*—Daniel M. Yasich
*Attorney, Agent, or Firm*—William B. Mason

[57] ABSTRACT

A tank wagon for transporting liquid material has a suction pump for drawing liquid material into the tank. Various sensing devices are used to prevent over filling so that material drawn into the tank does not reach the pump. In one form, a float valve in the vacuum conduit shuts the same and/or electrodes are positioned to sense the material level and energize a relay-operated switch that stops the engine driving the pump. Several indicators in the form of lamps or an acoustic horn are operated by short-circuiting electrodes within the tank and give a signal or indication of the liquid level within the tank. In a further embodiment, a float within the tank actuates an ammeter outside the tank to give a signal or reading of the liquid level within the tank.

7 Claims, 8 Drawing Figures

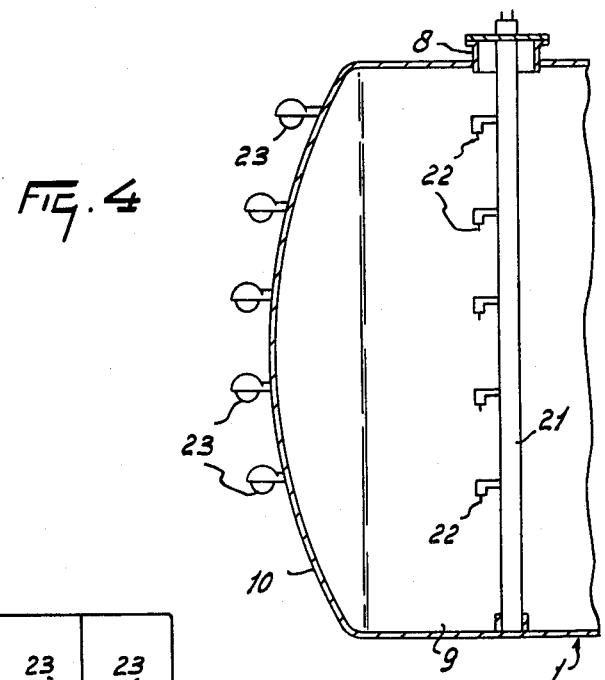
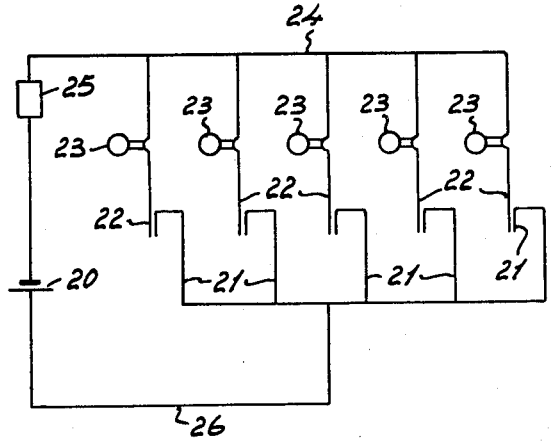
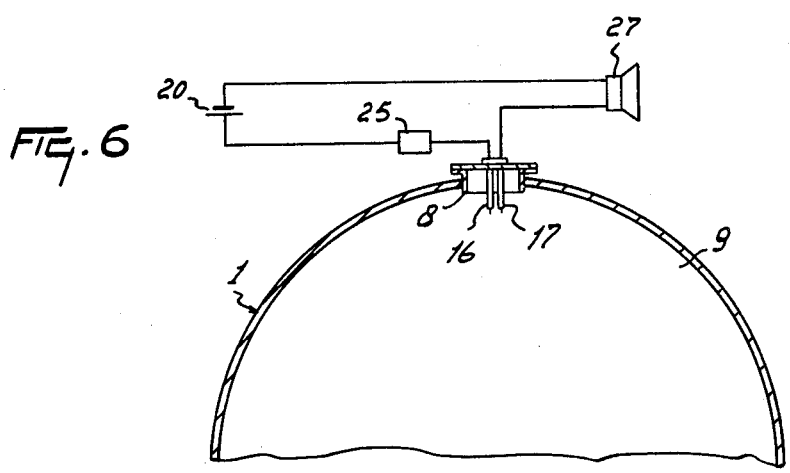

TANK FOR TRANSPORTING LIQUID MATERIAL

This invention relates to tanks for transporting liquid material. Hereinafter where reference is made to "front", "rear" and so on, this is with respect to the intended direction of forward movement of the tank over the ground.

According to the present invention there is provided a tank for transporting liquid material, the tank having associated therewith a suction pump for drawing material into the tank and there being inside the tank a float that is pivotally connected with a substantially air-free housing in the tank, and outside the tank electrically-operated indicating means for indicating the position of the float. It can be important that the fluid drawn into the tank should not reach the pump, and the possibility of obtaining indication of the fluid level within the tank facilitates avoiding such an occurrence.

Figure 3:
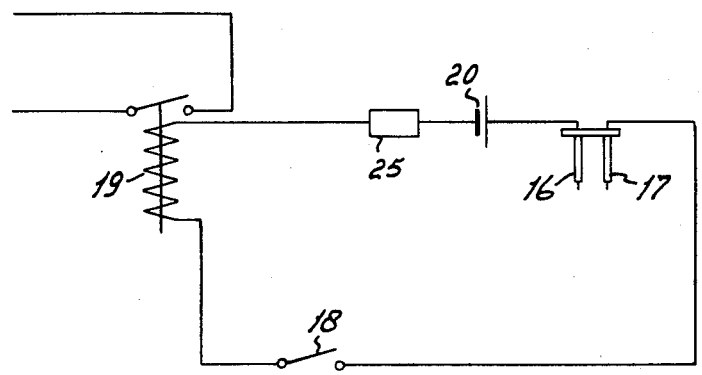
Figure 2:
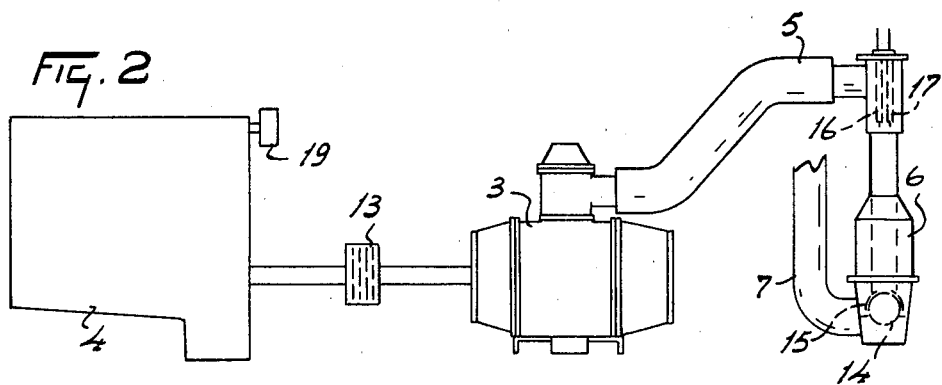
Figure 7:
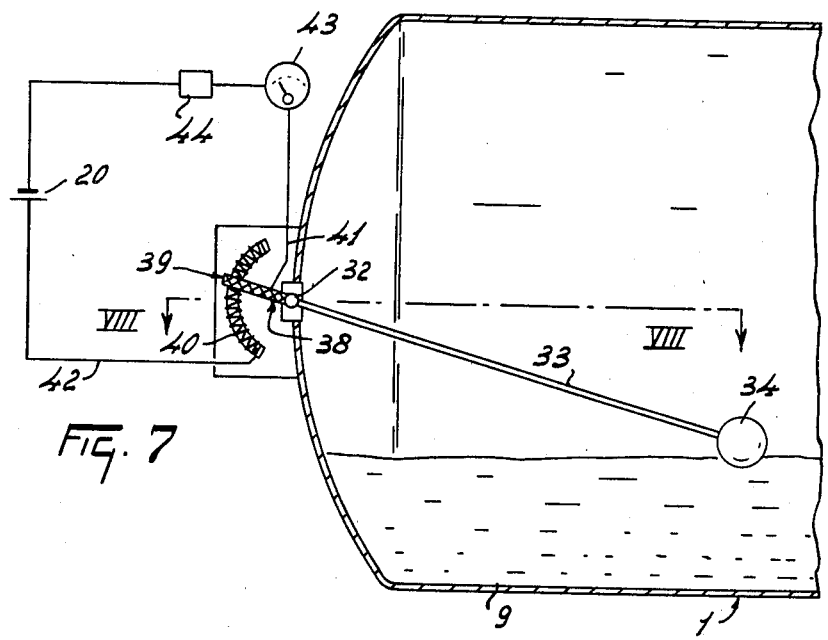
Figure 8:
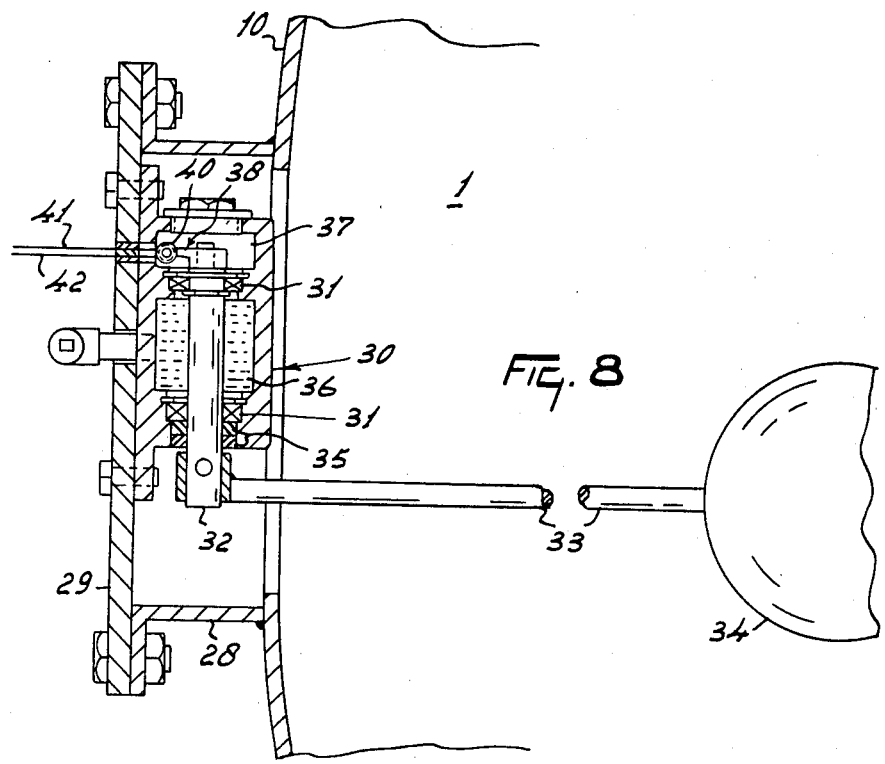

For a better understanding of the invention and to show how the same may be carried into effect, reference will now be made, by way of example, to the accompanying drawings, in which:

FIG. 1 is a side view of a tank wagon,

FIG. 2 illustrates schematically the disposition of component parts, associated with the tank of the wagon of FIG. 1, for drawing liquid material into the tank, FIG. 3 is an electric diagram relating to the component parts of FIG. 2, FIG. 4 shows schematically a device for indicating the liquid level inside the tank, FIG. 5 is an electric diagram relating to the device of FIG. 4, FIG. 6 shows schematically a further form of liquid level indicator of the tank, FIG. 7 shows schematically a different form of liquid level indicator, and FIG. 8 is a sectional view taken on line VIII—VIII in FIG. 7.

The tank wagon shown in FIG. 1 has a tank 1 secured to a two-axle truck chassis 2. This tank wagon is, therefore, a non-sectional wagon supported by wheels on a front axle and a rear axle. The tank wagon could, however, be constructed in the form of a semi-trailer or a trailer equipped with the tank 1. The chassis 2 of the truck shown in FIG. 1 (or of the semi-trailer or trailer) is provided with an intake/compression pump 3, which can be driven by means of the driving engine 4 of the truck (or the tractor hauling the trailer). The pump 3 is connected through a conduit 5 with the top of a vertically extending control-tube 6, the lower end of which communicates through a conduit 7 with a connecting piece 8 at the top front of the tank 1.

The tank 1 has a cylindrical central portion 9 which is closed at both ends by hemi-spherical covers 10 and 11. The tank 1 is disposed so that the center line of the cylinder 9 is inclined upwards and forwards with respect to the direction of forward travel A of the truck. This center line is at an angle of about 8° to a horizontal plane. Near the rear bottom of the tank 1 there is an inlet/outlet tube 12 by means of which fluid can be drawn into the tank, or forced out of the tank.

Turning to FIG. 2, the pump 3 is driven from the driving engine of the tank wagon through a coupling 13 that can be engaged or disengaged by the driver.

The control-tube 6 includes a spherical closing member 14 which serves to prevent liquid from the tank from rising in the tube 6 and reaching the pump 3 via the conduit 5. Penetration of fluid to be transported in the tank into the pump 3 should be definitely avoided, since in this case the pump could be irreparably damaged. When the tank 1 is filled with fluid, this fluid could flow through the conduit 7, the control-tube 6 and then through the conduit 5 to the pump 3 were it not for the closing member 14 which is urged against a stop 15 by fluild rising in the bottom part of the control-tube 6 and therefore constitutes a means for preventing the fluid from reaching the pump 3, but practice has shown that this means is not sufficiently reliable. In the present tank wagon, therefore, in order adequately to ensure that the fluid cannot reach the pump 3, the top end of the control-tube 6 is provided with indicating means formed by two electrodes 16 and 17, each of which is insulated from the other and from the control-tube 6. These electrodes are disposed parallel to one another and extend from the top of the control-tube 6 downwards inside the control-tube to a level located below the neighbouring inlet opening of the conduit 5. The electrodes 16 and 17 are in a circuit (FIG. 3) with a switch 18, a coil for a relay 19, a current-inhibiting resistance 25 and an battery 20 of the tank wagon. The switch 18 is associated with the coupling 13 such that the switch 18 automatically closes when the driver engages the coupling drivingly to connect the driving engine 4 to the pump 3. On the other hand, when the driver disengages the coupling 13 to isolate the pump 3 from the engine 4, the switch 18 automatically opens. The switch of the relay 19, which is closed by current passing through the coil, is associated with the driving engine 4 in a manner such that when the switch of the relay 19 is closed, either the ignition (in the case of a petrol engine) is cut off, or the fuel supply (in the case of a diesel engine) is interrupted.

When the driver has coupled the pump 3 by means of the coupling 13 with the engine 4, and providing the switch of the relay 19 is open, the pump 3 produces in the tank 1 a negative pressure so that liquid is drawn in through the tube 12. When the tank is full and liquid tends to enter the lower end of the control-tube 6 through the conduit 7, and if the closing member 14 does not sufficiently shut off, the liquid rises in the control-tube 6 until it reaches the lower ends of the electrodes 16 and 17. If the liquid is electrically conductive, the electrodes 16 and 17 are short-circuited so that the circuit of FIG. 3 passes current from the battery 20 through the coil of the relay 19, the switch of which is thus closed. Thus either the ignition of the engine 4 is cut off or the fuel supply to the engine is stopped so that the pump 3 stops as soon as the liquid level attains the lower ends of the electrodes 16 and 17. In this way the liquid is prevented from reaching the pump 3 and hence from causing damage but the engine is, of course, only stopped if the switch 18 is closed, i.e. if the coupling 13 is engaged. If the coupling 13 is disengaged, the switch 18 opens and the engine can be operated for moving the tank wagon but in this condition the pump 3 is not driven.

From FIG. 4 it can be seen that the connecting piece 8 is joined by a vertical metal riser 21, in which fluid drawn in through the tube 12 can rise. To one side of the vertical riser 21 are fastened at equal intervals several electrodes 22, in this embodiment five. Each of the five electrodes 22 is insulated against the entire surrounding structure and passes out of the connecting piece 8. Only the free end of each electrode 22 is not insulated. The metal riser 21 itself serves as a common counter-electrode for all the electrodes 22. For this purpose the distance between the tube 21 and each electrode 22 is appreciably smaller than the distance between any two adjacent electrodes 22. Each of the electrodes 22 is connected outside the tank through an individual incandescent lamp 23 to a feed lead 24 (FIG. 5), which is connected to the accumulator 20 via a resistance 25 inhibiting the current through the circuit. The common electrode 21 formed by the riser is connected through a lead 26 to the other terminal of the accumulator. The incandescent lamps 23 are mounted at the front end of the tank so that they are visible to the operator (in the illustrated form they are mounted on the cover 10). The row of incandescent lamps 23 extends in a vertical direction and each lamp 23 is located in the same horizontal plane as the electrode 22 connected in series with it as is apparent from the circuit arrangement of FIG. 5.

When the tank 1 is filled by means of the pump 3 driven by the engine 4 via the coupling 13 so that through the path 5/6/7 a subatmospheric pressure prevails in the tank and liquid material is drawn into the tank through the tube 12, the level of the liquid in the tank rises slowly. At a given instance the liquid will short-circuit the lowermost electrode 22 and the steel riser 21 so that the incandescent lamp 23 located at the same level on the outside of the tank is illuminated. The operator can thus perceive that the liquid level has reached the height of the illuminated lamp. As the liquid rises further the second electrode 22 is short-circuited against the riser 21 so that the second incandescent lamp 23 located at this level is illuminated, and so on for the remaining lamps. The operator can, therefore monitor the height of the liquid in the tank and when the topmost electrode 22 is attained, he can take steps to switch off the pump 3 by disengaging the coupling 13 so that the liquid is prevented from reaching the pump 3 and from damaging it.

A simple embodiment is shown in FIG. 6, which is a sectional view of the tank in the area of the connecting piece 8. Also in this embodiment two electrodes 16 and 17 are disposed parallel to one another and at a distance from one another in a substantially vertical downward direction, these electrodes being insulated from one another and from the ambient structure with only the lower end of each electrode being un-insulated. At the area where each electrode emerges from a releasable cover of the connecting piece 8 the electrode 17 is connected to a connection of an acoustic horn 27, the other terminal of which is directly connected to a terminal of the battery 20. The electrode 16 is connected to the other terminal of the battery 20 through a current-inhibiting resistor 25. When the liquid level rises in the tank 1, it reaches the non-insulated lower ends of the electrodes 16 and 17 when the tank is almost full, these lower ends being located near the top of the tank. The liquid then electrically short-circuits the electrodes 16 and 17 so that the horn 27 is sounded. By this signal the operator is informed that the tank is almost full so that by dis-engaging the coupling 13 he can put the pump 3 out of operation and prevent the liquid reaching the pump.

The indicators so far described, actuated by the short-circuiting of two electrodes by the liquid, require the liquid to be electrically conductive. If the liquid to be transported does not exhibit this property, an indicator as shown in the embodiment of FIGS. 7 and 8 can be employed. In this form an operating member of the indicator is disposed inside the tank, near the point of intersection of the center line of the tank and the cover 10. A cylindrical housing 28 is disposed near the point just mentioned on the cover 10 in coaxial disposition with the center line of the tank, this housing being closed by a flat, releasable cover 29. The space inside the housing 28 is in open communication with the interior of the tank 1. On the inner side of the cover 29 there is bearing housing 30 containing two relatively spaced bearings 31 holding a horizontal pivot shaft 32 extending transversely of the direction of forward travel A of the tank wagon. An end of the pivot shaft 32 projecting out of the bearing housing 30 is provided with an arm 33, whose end remote from the housing 30 is provided with a hollow ball float 34 floating on the surface of the liquid in the tank.

The end of the pivot shaft 32 remote from the arm 33 is located inside the bearing housing 30 and is thus isolated from the liquid located inside the tank. Near the arm 33, at the side of the bearing 31 concerned, seals 35 are provided for sealing the space inside the bearing housing 30 against the liquid to be transported. The bearing housing 30 has a space 36 around the pivot shaft 32, which is closed by the housing 30 and the seal 35 from the space inside the tank. This space 36 is air-free, completely filled with a hydraulic fluid, preferably a thick-liquid oil, which prevents the liquid to be transported from penetrating into a second space 37 in the bearing housing 30, into which space extends one end of the pivot shaft 32. The space 37 is located on that side of the space 36 which is remote from the seal 35. An additional seal or seals can be located in housing 30 in a conventional arrangement known from one or more of U.S. Pat. Nos. 2,738,208; 4,156,530 and Brit. Pat. No. 323,632.

The fluid completely filling the space 36 may be exposed to excess pressure. This excess pressure can be produced by a hydraulic pump associated with the tank wagon, which may also be used for other purposes.

The end of the pivot shaft 32 located in the space 37 is also provided with an arm 38 which is rotationally fast with the pivot shaft 32. An end 39 of the arm 38 remote from the pivot shaft 32 is electrically insulated from the remainder of the arm 38 and the pivot shaft 32 and from the surrounding structure. The free end of this insulated portion of the arm 38 carries a cursor which is in engagement with the turns of the coil of a potentiometer 40 or variable switch means, which is arcuate around the center line of the pivot shaft 32. As shown in FIG. 8 the cursor on the arm 38 is electrically connected to an electric lead 41 and one end of the turns of the coil of the potentiometer 40 is connected to an electric lead 42. The leads 41 and 42 are passed through the cover 29 to outside the tank. The passage for these two leads can be readily sealed so that at this area the liquid to be transported cannot leak out of the tank, even when the tank is subjected to excess pressure. The lead 42 is connected to a terminal of the battery 20 (FIG. 7). The lead 41 is connected to the input of an ammeter 43, the other input of which is connected through a resistor 44 to the other terminal of the battery 20.

When the tank is filled or emptied, the ball float 34 floats on the surface of the liquid so that the position of the arm 33 and that of the pivot shaft 32 are indicative of the quantity of liquid in the tank. During filling or emptying operations the cursor at the insulated end 39 of the arm 38 slides along the turns of the coil of the potentiometer 40 so that the resistance of the coil between the lead 42 and the cursor on the arm 38 varies in magnitude, the resultant change in current strength in the circuit being indicated by the ammeter 43, which like the battery 20 and the resistor 44, is located outside the tank. The dial of the ammeter 43 is calibrated for the quantity of liquid in the tank, the opposite ends of the dial corresponding to an empty and a full tank respectively.

Since the space 36 constantly contains a quantity of hydraulic fluid (pressurized or not pressurized), the liquid to be transported is prevented from penetrating out of the tank into the space 37 irrespective of whether the tank has subatmospheric pressure or excess pressure. The only passage through the effective tank wall is that for the two electric leads 40 and 41 and can be satisfactorily sealed, and all movable parts are located inside the tank. The fluid in the space 36 prevents air or transported liquid from reaching the space 37. The ammeter 43 can be disposed at a place readily visible to the operator who fills or empties the tank. The assembly of the housing 30, the arm 33 and the float 34 can be removed from the tank by loosening the cover 29.

While various features of the tanks that have been described, and that are illustrated in the drawings, will be set forth in the following claims as inventive features, it is to be noted that the invention is not necessarily limited to these features and that it encompasses all of the features that have been described both individually and in various combinations.

I claim:

1. A tank for transporting liquid material comprising an enclosed tank having an internal float, said float being pivoted to external indication means that signals the level of said float means and material within the tank, a pivot member interconnected to said float means and said member extending through a liquid seal means in a housing on said tank to said float means, said indication means comprising an electrical circuit having variable switch means associated with a movable portion of the pivot member, said portion and electrical circuit being located outside the tank, said pivot member being actuated responsive to the movements of said float, said electrical circuit including a signal device which indicates the position of said pivot member relative to said switch means and the level of material within said tank, said seal means comprising a seal element in said housing and said housing defining an air-free space filled with hydraulic fluid, said pivot member comprising a shaft that extends through said element and said fluid, said movable portion and said circuit being insulated from the liquid material in said tank and said signal device being positionable remote from said tank.

2. A tank as claimed in claim 1, wherein the float is connected to one end of said pivot member by an arm and said portion is an electric part on the opposite shaft end that is mounted to move with said shaft, the two ends being located outside said space and being separated by same.

3. A tank as claimed in claim 2, wherein said electric part carries a cursor that moves along the turns of a coil of said switch means.

4. A tank as claimed in claim 3, wherein said electric part and cursor are insulated from said shaft and said signal device is an ammeter.

5. A tank as claimed in claim 1, wherein the hydraulic fluid is pressurized.

6. A tank as claimed in claim 1, wherein one and of the tank mounts an enclosure that communicates with the tank interior and said housing is a fluid filled bearing housing within said enclosure, one end of the bearing housing being exposed to liquid material in said tank and the other end being located out of communication with the tank interior.

7. A tank as claimed in claim 6, wherein said circuit includes leads that extend into said enclosure to said movable shaft portion and said switch means adjacent said other end of the bearing housing.

* * * * *